HENRY LEWIS
INVENTOR

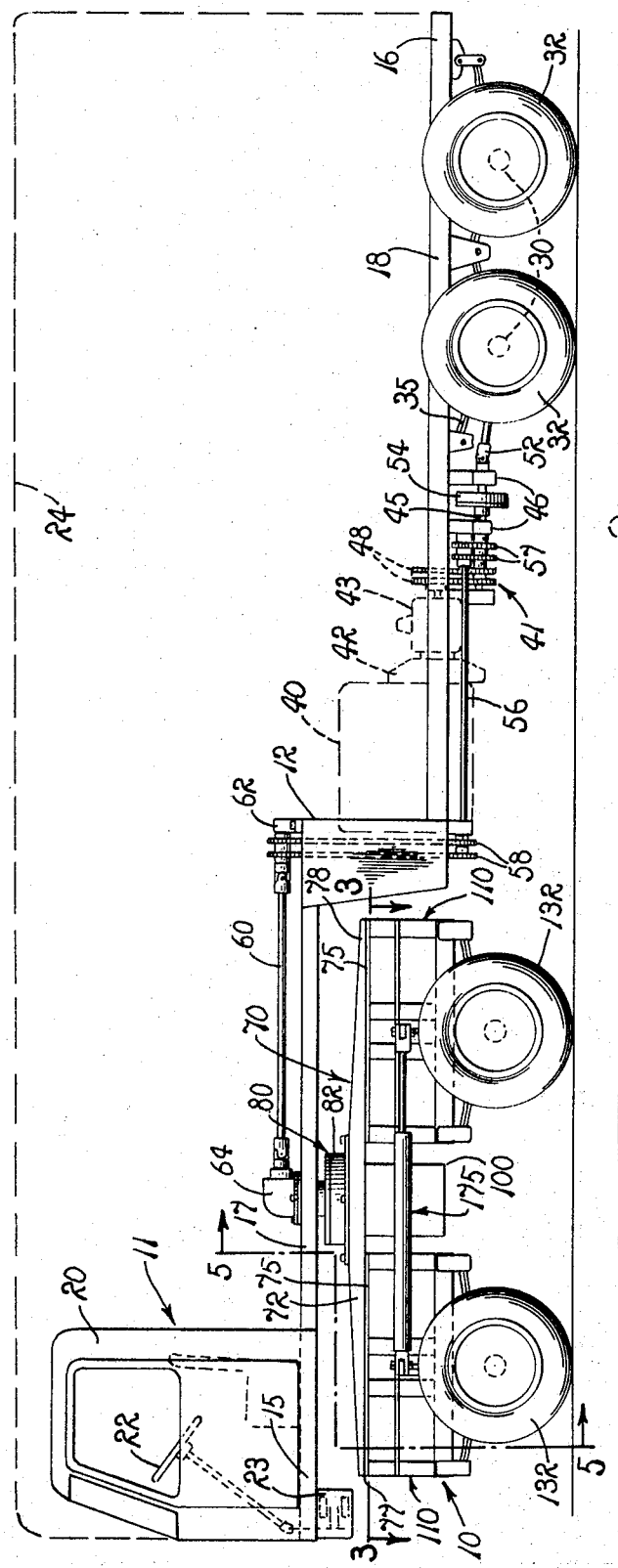

Huebner & Worrel
ATTORNEYS

United States Patent Office 3,454,123
Patented July 8, 1969

3,454,123
COMPOUND STEERING MECHANISM FOR VEHICLES
Henry Lewis, P.O. Box 92, Biola, Calif. 93606
Filed Jan. 8, 1968, Ser. No. 696,304
Int. Cl. B62d *3/02, 61/10*
U.S. Cl. 180—23    10 Claims

ABSTRACT OF THE DISCLOSURE

A compound steering mechanism for vehicles providing a steering chassis pivotally supporting one end of a main frame for the vehicle including a pair of axle frames pivotally mounted on the steering chassis having power driven sets of dual wheels and powered means interconnecting the axle frames for pivoting them in opposite directions to positions angularly related to the steering chassis with the wheels disposed in tracking relation and with the main frame angularly positionable with respect to the steering chassis for effecting relatively small radius turning of the vehicle.

Background of the invention

It has long been desirable to be able to employ dual wheels on the steering axles of automotive vehicles particularly on heavy duty trucks, buses, semitrailer and tractor rigs, and the like. The advantages are, of course, apparent in that such dual wheel structures are able to provide greater stability and braking power and, if power driven, provide substantially greater traction and greater load supporting capabilities. Dual wheels have heretofore not been readily adapted to the steerable wheels of such vehicles because of the relatively large degree of angular displacement required of the steerable axles necessary to provide an acceptable turning radius particularly when manipulating the vehicle during parking. Furthermore, the existing steerable axles of conventional vehicles are not normally rugged enough to accommodate dual wheels and the steering linkages do not provide sufficient turning forces to manipulate such heavy duty dual wheel structures. If dual wheels were mounted on conventional steering axles, the tires would be subjected to a substantial amount of objectionable lateral skidding and/or scuffing which would greatly accelerate tread wear and greatly impair steerability of the vehicle.

Summary of the invention

Accordingly, it is an object of the present invention to provide an improved compound steering mechanism for a vehicle which is capable of utilizing sets of dual steerable wheels.

Another object is to provide such an improved compound steering mechanism which is readily adaptable to virtually any type of vehicle.

Another object is to provide an improved compound steering mechanism which enables steerable dual wheels utilized therewith to be power driven.

Another object of the present invention is to provide a compound steering mechanism which is capable of utilizing single axles of more rugged construction than the split axles for the steerable wheels of conventional vehicles.

Another object is to provide a compound steering mechanism which has a steering chassis pivotally mounted on the main frame of the vehicle by a fifth wheel structure.

Another object is to provide ac ompound steering mechanism in which the steering chassis pivotally supports a pair of such single axles with each axle supporting sets of dual steerable wheels.

Another object is to provide a compound steering mechanism in which the sets of dual wheels are angularly positionable relative to each other in tracking relation for effecting relatively small radius turns with a minimum of angular displacement of the axles relative to the steering chassis.

Other objects and advantages of the present invention will be more fully apparent upon reference to the following description in the specification.

Brief description of the drawings

FIG. 1 is a side elevation of a heavy duty vehicle having a compound steering mechanism and powered drive train embodying the principles of the present invention.

FIG. 2 is a top plan view of the vehicle and steering mechanism of FIG. 1.

Description of the preferred embodiment

Figure 3:
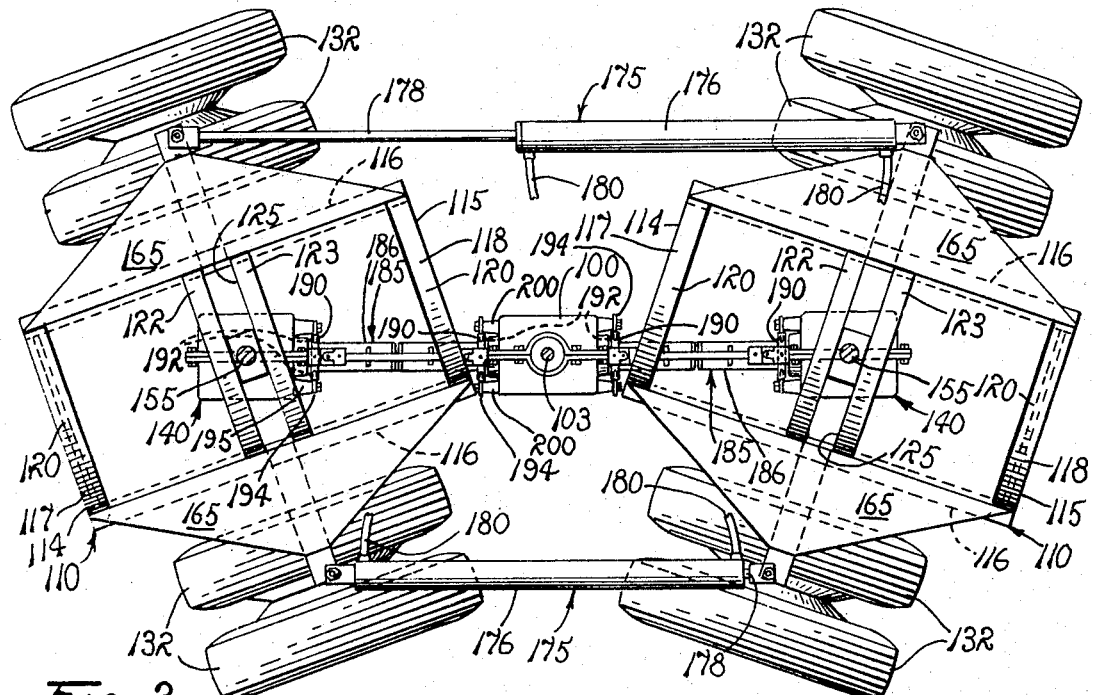
FIG. 3 is a somewhat enlarged longitudinal horizontal section through the compound steering mechanism of the present invention taken on line 3—3 of FIG. 1, showing steerable dual wheels thereof disposed in a maximum angular position with respect to the steering chassis.

Referring more particularly to the drawings, a compound steering mechanism, generally indicated by the reference numeral 10, is utilized with a heavy duty vehicle such as the low-boy truck 11 having an elongated main frame 12. The main frame provides predetermined opposite forward and rearward ends 15 and 16, respectively, with the forward end providing an upper deck 17 stepping down to a lower deck 18 adjacent to the rearward end of the main frame. The upper deck supports an operator's cab 20 adjacent to the forward end of the main frame which provides a steering wheel 22 operationally connected to an hydraulic steering control valve 23 connected to an hydraulic pump, not shown, on the main frame. The steering wheel is shown only as a conventional expedient for steering the vehicle and may be replaced, if desired, by a single lever-type steering control member, not shown, connected to the steering valve. Furthermore, while the cab and the main frame are shown as a low-boy trailer-type truck, the vehicle may be alternatively provided with an enclosed body, as indicated by the dashed lines at 24 adapting the frame to a bus-type vehicle.

The rearward end 16 of the main frame 12 is supported for earth traversing movement on a pair of conventional axles 30 each supporting sets of dual wheel assemblies 32. Each of the axles has a centrally disposed differential housing portion 33 with the axles connected to the main frame by a plurality of leaf spring and shackle assemblies 35. The vehicle is powered by an engine indicated by the dashed lines at 40 which includes a power train 41 having a main clutch 42 and a transmission 43 controllable through suitable linkage, not shown, from the operator's cab 20. The power train further includes a lower drive shaft 45 which is journaled in a pair of spaced bearing blocks 46 mounted in depending relation from the main frame 12. The forward end of the drive shaft is driven by a dual sprocket and chain assembly 48 from the transmission 42. The drive shaft has a pair of universal couplings 52 connecting it to the differential housing 33 of the rear axles and an auxiliary clutch 54 interposed the bearing blocks 46. The auxiliary clutch is normally spring tensioned to an engaged position to transfer the drive to the rear dual wheels 32 incident to manipulation of the main clutch 41 but being operative to interrupt the drive to the rear dual wheels in certain situations.

The drive train 41 also provides an elongated forwardly extended drive shaft 56 journaled below the rearward end 16 and lower deck 18 of the main frame 12. The forwardly extended drive shaft is driven by a sprocket and chain assembly 57 at its rearward end from the lower drive shaft 45. The forward end of the forwardly extended drive shaft is connected through a sprocket and chain assembly 58 to the rearward end of an upper drive shaft 60 on the upper deck 17 of the main frame. The rearward end of the upper drive shaft is journaled in a bearing block 62 and its opposite forward end is journaled in a transfer gear housing 64.

An elongated steering chassis 70 is disposed in supporting relation beneath the forward upper deck 17 of the main frame 12. The steering chassis is constructed of a pair of oppositely spaced substantially parallel box section side members 72 interconnected by substantially flat upper and lower plates 74 and 75, respectively. The steering chassis includes predetermined forward and rearward ends 77 and 78, respectively, with the chassis being pivotally connected intermediate its ends to the main frame by a fifth wheel mechanism 80. The fifth wheel mechanism provides a circular cupped housing 82 having a lower flange 83 bolted to the upper plate 74 of the steering chassis. The housing includes an upper circular wall 84 circumscribing a circular bore 85 which includes a lower annular frusto-conical seat 86. An elongated cylindrical pivot column 90 provides an upper flange portion 92 which is bolted to a pair of cross braces 93 in the upper deck 17 of the main frame. The pivot column includes a lower annular frusto-conical flange 95 which is complementarily tapered with respect to the seat 86 in the housing. A circular flange retaining cover 97 is secured to the upper wall 84 of the housing and has a bore extended therethrough in circumscribing relation to the pivot column and is of a diameter somewhat larger than the pivot column to permit angular displacement of the lower flange 95 on the conical seat 86 in order to accommodate lateral tipping of the main frame 12 relative to the steering chassis 70. A dual drive gear transfer box 100 is mounted in depending relation from the steering chassis 70 by a bracket 102 in aligned relation below the fifth wheel mechanism 80. An elongated drive transfer shaft 103 having a splined universal joint 104 is journaled at its upper end in a bearing 105 in the pivot column 90 and is downwardly extended through a bearing 106 at its lower end in the gear transfer box 100. A pair of beveled gears 107 and 108 are individually mounted on the upper and lower ends of the drive transfer shaft. The upper beveled gear 107 is disposed within the transfer gear housing in meshing relation with a beveled gear 109 mounted on the forward end of the upper drive shaft 60.

A pair of axle frames 110 are individually pivotally mounted beneath the forward and rearward ends 77 and 78, respectively, of the steering chassis 70. Each of the axle frames provides a lower rectangular box portion 112 which has predetermined forward and rearward ends 114 and 115, respectively, and opposite sides 116. A pair of arched stabilizer bars 117 and 118 are individually mounted in upwardly extended relation at the opposite ends of the axle frames in transversely extended relation between the opposite sides of the axle frames. The stabilizer bars provide upper peripheral portions 120 disposed in sliding engagement with the lower plate 75 of the steering chassis 70. A pair of interior stabilizer bars 122 and 123 are mounted intermediate the ends of the axle frames in predetermined spaced relation to each other to define therebetween an elongated arcuate transversely extended slot 125.

Each of the axle frames 110 supports an elongated transversely extended unitary axle 130 which mounts a pair of dual wheel assemblies 132 on the outer ends thereof at the opposite sides 116 of the axle frames. The axles are individually supported on their respective axle frames by leaf spring and shackle assemblies 135. The axles further include centrally disposed differential gear housing portions 136 which individually pivotally mount an upwardly disposed auxiliary gear box 140. The gear box houses a pair of intermeshing beveled gears 142 and 143. The lower beveled gear 143 is supported on a substantially vertically extended shaft 145 which is journaled in a bearing 146 in the gear box and which is extended downwardly into the differential housing 136 of the axle. The upwardly rearwardly disposed beveled gear 142 is mounted on an elongated shaft 150 through a bearing 152 in the gear box with the shaft having a pair of spaced universal joints 153 and a rearward end journaled in the transfer gear box 100 on the steering chassis 70. A beveled gear 154 is mounted on the rearward end of the shaft 150 within the gear transfer box 100 in meshing relation with the beveled gear 108. An identical beveled gear and drive shaft unit, the components of which have been given the same reference numerals, is provided for the rearwardly disposed axle 130.

Figure 5:
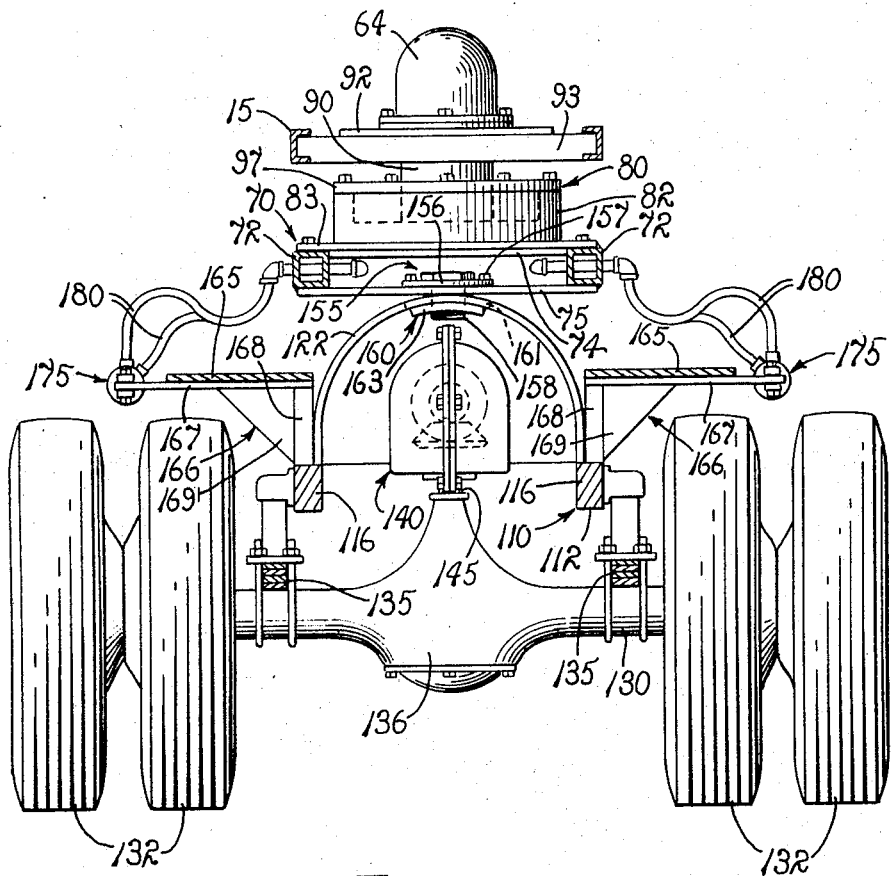
FIG. 5 is a somewhat enlarged transverse vertical section through the compound steering mechanism, taken on line 5—5 of FIG. 1.

Each of the axle frames 110 is mounted for rotation and for transverse tipping movement on the steering chassis 70 by a king pin 155. The king pin is extended through the lower plate 75 of the steering chassis and has an upper flanged portion which, as best shown in FIG. 5, is rigidly secured to the lower plate by the bolts 157. The king pin includes a lower screw-threaded portion 158 which extends downwardly through the slot 125 between the stabilizer bars 122 and 123. A combined guide and retaining shoe is screw-threadably received upon the lower screw-threaded end 158 of the king pin beneath the stabilizer bars 122 and 123. The guide has a slidable block portion 161 slidably disposed within the slot 125 and a shoe portion 163 underlying the stabilizer bars 122 and 123.

A pair of laterally outwardly extended wing plates 165 are disposed at each side of each of the axle frames 110 in substantially horizontal coplanar relation. Each of the plates includes a supporting structure 166 having an outwardly extended arm 167 connected to an upstanding beam 168 which arm and brace are braced by a triangular gusset plate 169. A pair of hydraulic jacks 175 are individually disposed in interconnecting relation between the axle frames 110 at the opposite sides 116 thereof. Each of the jacks includes a cylinder end 176 and an opposite rod end 178. One of the jacks has its cylinder end pivotally connected to the outer end of the arm 167 on the rearwardmost axle frame 110 while the cylinder end of the other jack is pivotally connected to the arm on the opposite side of the forwardmost axle frame. The rod ends 178 of the jacks are individually pivotally connected to the ends of the support arms 167 at the opposite sides of the forwardmost and rearwardmost axle frames, respectively. The hydraulic jacks are individually connected to the steering valve 23 on the main frame 12 of the vehicle by the hoses 180, fragmentarily shown in FIG. 5, for simultaneous contra-extendible retractable movement of the rod ends of the jacks for rotating the axle frames in opposite directions.

A pair of adjustable torsion or tension bars 185 are individually connected between the auxiliary gear boxes 140 and the gear transfer box 100 to maintain them in substantial upright alignment.

Figure 4:
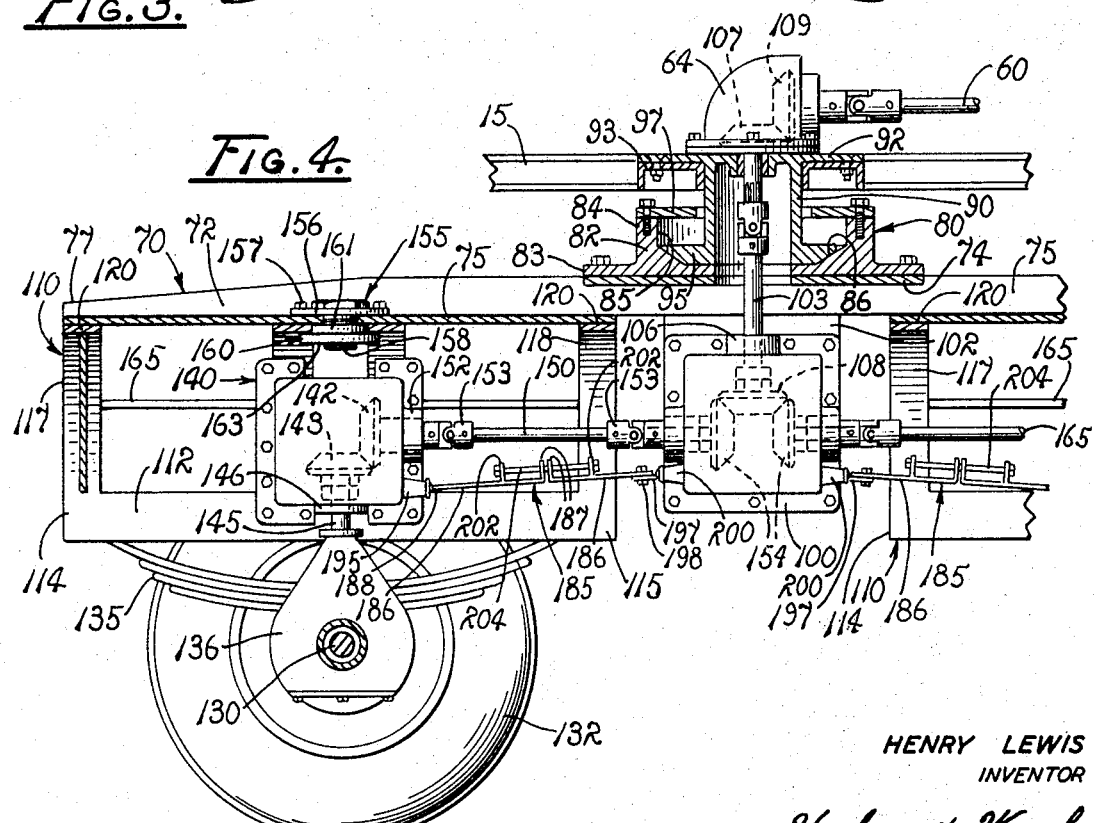
FIG. 4 is a longitudinal vertical section through the compound steering mechanism, taken generally along the line 4—4 of FIG. 3.

As best shown in FIGS. 3 and 4, each of the torsion bars provides a pair of elongated substantially rigid straps 186 which include substantially right angularly related inner ends 187 disposed in facing closely spaced relation and opposite ends 188. The end of each torsion bar adjacent to its associated auxiliary gear box 140 mounts a transversely extended tubular member 190 which has opposite ends individually slidably receiving a pair of connector studs 192 endwardly extended therefrom. The studs provide outer ring portions 194 which are individually rigidly bolted to a pair of protuberances 195 integrally extended from the auxiliary gear boxes 140.

The end of the torsion bar adjacent to the gear transfer box 100 is connected to a stub plate 197 for limited misalignment by rotation about the substantially vertical axis of a connecting bolt 198. The stub plate is mounted on a pair of protuberances 200 extended from the gear transfer box 100 by a connection identical to that previously described at the opposite ends 188 of the torsion bar, the components of which have been provided with identical reference numerals. The torsion bars individually further include spaced substantially upstanding ears 202 and an elongated bar tensioning bolt 204 which is extended through the ears and through the inner ends 187 of the bars yieldably to resist transverse tipping and misalignment of the gear boxes.

*Operation*

The operation of the described embodiment of the subject invention is believed to be clearly apparent and is briefly summarized at this point. During straight-line ground traversing movement of the truck 11, power from the engine 40 is directed through the power train 41 to drive all of the dual wheels 32 and 132. It will be noted that the normally engaged rear clutch 54 can be disengaged by the operator from the cab 20 during certain situations such as to preclude fish-tailing of the rearward end 16 of the main frame 12 in order to permit the rearward end precisely to follow the forward steering chassis 70 in trailing relation.

When it is desired to effect a turn of the truck, the steering wheel 12 is manipulated to actuate the steering valve 23. Upon such actuation, hydraulic fluid is directed through the hoses 180 to the appropriate end of the cylinder 176 of the hydraulic jacks 175. If a left hand turn is desired, the hydraulic jacks are actuated to the position shown in FIG. 3 with the lowermost jack retracted and the uppermost jack extended. This causes the axle frames 110 to be rotated in opposite directions about their respective king pins 155 and the dual wheels 132 to be disposed in substantially tracking relation for turning movement of the steering chassis with a minimum of skidding or scuffing of the tires relative to the ground. During the described rotation of the axle frames, the guide shoe 160 is rotated upon the lower screw-threaded end of the king pin by the block portion 161 thereof being disposed in the slot 125 between the stabilizer bars 122 and 123. Also during such rotary movement, the upper peripheries 120 of the stabilizer bars slide against the lower plate 75 of the steering chassis 70 in continuous supporting relation so as to preclude any fore and aft tipping of the axle frames relative to the steering chassis.

It is noted that during such turning movement of the axle frames 110 relative to the steering chassis 70, the auxiliary gear boxes 140 remain in substantially longitudinally aligned relation with the transfer gear box 100 so as continually to provide a powered drive to the dual wheels 132. Such aligned relationship between the transfer gear box and the auxiliary gear boxes on the axle frames is further maintained by the torsion bars 185 disposed in interconnecting relation therebetween. The primary function of the torsion bars is yieldably to resist transverse tipping of the axle frames to maintain the desired alignment of the power train when one of the dual wheelse 132 on one side of the steering chassis encounters an obstruction or depression in the ground traversed. Limited transverse tipping of the individual axle frames 130 is permitted by rotary sliding movement of the upper peripheries 120 of the stabilizer bars relative to the lower plate 75 of the steering chassis. During such rocking movement, the intermediate stabilizer bars 122 and 123 are permitted to slide relative to the block portion 161 of the guide shoe which is movable through the slot 125 to accommodate such rocking movement. It is noted that the arcuity of the stabilizer bars is substantially concentric to the drive shafts 150 which provides an axis of rotation for the axle frames during such rocking or transverse tipping with the beveled gears 142 and 143 in continuous engagement so that there is no interruption in the transmission of power to the dual wheels 132.

As is apparent from FIG. 3, when the hydraulic jacks are actuated angularly to position the axle frames 110 relative to the steering chassis 70, the rearward end 16 of the main frame 12 is permitted to swing to a position also angularly related to the steering chassis by the fifth wheel mechanism 80. It is further noted that during the minimum radius turn effected by maximum extension and retraction of the hydraulic jacks 175, the rearward clutch 54 is disengaged to preclude lateral shoving of the steering chassis by the powered rear drive wheels 32. Accordingly in such angular relationship, the steering chassis can reach a maximum 90° relationship with the rearward end of the main frame so as to spin or pivot the main frame about the rearward wheels 32. Consequently, a minimum radius turn can be accomplished with the compound steering mechanism of the present invention with a minimum angular displacement of the steering axles, which has been heretofore impossible with conventional steering systems. Transverse tipping movement of the rearward end of the frame is accommodated by the fifth wheel mechanism wherein the lower flange 95 of the pivot column 90 is permitted limited transverse sliding movement upon the conical seat 86.

In view of the foregoing, it is readily apparent that the structure of the present invention provides an improved compound steering mechanism for vehicles which enables the vehicle to be precisely maneuvered under full power with the utilization of dual wheels on the steering axles of the vehicle. The steering axles are angularly positionable relative to the steering chassis with the wheels disposed in precisely tracking relation and with the rearward end of the main frame angularly disposed in trailing relation to the steering chassis. Such compounding of the angular displacement between the several frames of the vehicle permits minimum radius turns to be effected with a minimum of lateral scuffng on the steerable wheels substantially to minimize tread wear and to increase the load carrying capacity of the vehicle.

Although the invention has been herein shown and described in what is conceived to be the most practical and preferred embodiment, it is recognized that departures may be made therefrom within the scope of the invention, which is not to be limited to the details disclosed herein.

Having described my invention, what I claim as new and desire to secure by Letters Patent is:

1. A compound steering mechanism, for a vehicle having an elongated main frame providing opposite ends and sets of power driven non-steerable wheels disposed in supporting relation to one end thereof, comprising a steering chassis disposed in pivotal supporting relation to the end of the main frame opposite from said one end; a pair of axle frames individually mounting sets of steerable dual wheels and being individually pivotally mounted in spaced relation on said steering chassis; and powered means interconnecting said axle frames for simultaneously oppositely rotating the axle frames to positions angularly related to said steering chassis with their respective sets of wheels disposed in tracking relation and with the main frame angularly positionable with respect to the steering chassis for effecting relatively small radius turning of the vehicle with a minimum of axle frame movement.

2. The compound steering mechanism of claim 1 in which said main frame has predetermined forward and rearward ends with said nonsteerable wheels being mounted at said rearward end and said steering chassis mounting said steerable wheels at said forward end, said axle frames having opposite sides, and said powered means comprising a pair of extendible-retractable members individually connected between the corresponding opposite sides of the axle frames.

3. The compound steering mechanism of claim 2 wherein said extendible-retractable members are telescopic cylinders, and control means on the main frame having controlling connection to said cylinders.

4. The compound steering mechanism of claim 1 including a power source on the main frame, and a power train connecting said power source with said steerable wheels whereby said steerable wheels are power driven.

5. The compound steering mechanism of claim 4 in which said axle frames individually provide arched stabilizer members providing rocking connections with their respective pivotal connections on the steering chassis to permit independent transverse tipping of the axle frames incident to said steerable wheels encountering obstructions and depressions in the ground traversed.

6. The compound steering mechanism of claim 5 in which said axle frames are elongated and individually provide predetermined opposite forward and rearward ends, each of said axle frames having a pair of said arched stabilizer members disposed in relatively closely spaced relation intermediate their ends which define an elongated slot therebetween with the slot arcuately transversely extended between said sides of the axle frame, a king pin journaled in said steering chassis above each of said axle frames and having a lower end extended through its associated slot, and a guide shoe mounted on the end of each king pin beneath its adjacent pair of stabilizer members in sliding engagement therewith to accommodate said transverse tipping and rotation of the axle frames.

7. A compound steering mechanism, for a vehicle having an elongated main frame providing predetermined forward and rearward ends and sets of power driven, non-steerable dual wheels disposed in supporting relation to said rearward end thereof, comprising an elongated steering chassis having predetermined forward and rearward ends disposed beneath said forward end of the main frame and opposite sides; a fifth wheel mechanism pivotally interconnecting said main frame and the chassis; a pair of axle frames individually disposed beneath said forward and rearward ends of the steering chassis and individually providing opposite inner and outer ends and opposite sides with the inner ends disposed in spaced relation longitudinally of the steering chassis, each of said axle frames mounting an elongated transversely extended axle having opposite ends rotatably supporting sets of steerable dual wheels at the opposite sides of the steering chassis; a plurality of upwardly extended arched stabilizer bars mounted on each of said axle frames with at least two of the bars disposed in closely spaced adjacent relation intermediate the ends of their respective axle frames defining therebetween an elongated slot transversely arcuately extended between the opposite sides of each axle frame; a king pin rotatably journaled in the steering chassis in substantially centered relation above each of the axle frames and having a lower end extended through said slot between said adjacent stabilizer bars; a guide shoe mounted on the lower end of each of the king pins providing an upper block portion slidably disposed within the slot and a shoe portion underlying the adjacent stabilizer bars in sliding engagement therewith to permit transverse tipping of the axle and axle frame incident to said dual wheels encountering obstructions and depressions in the ground traversed; and a pair of hydraulic jacks individually interconnecting the corresponding opposite sides of the axle frames for simultaneous contra-movement to rotate the axle frames about their respective king pins in opposite directions relative to the steering chassis with their respective sets of dual wheels continuously disposed in tracking relation and with said main frame being permitted to pivot on said fifth wheel mechanism relative to said steering chassis for effecting relatively small radius turns with a minimum of axle frame movement.

8. The compound steering mechanism of claim 7 including a power source on the main frame, and a power train continuously connecting said power source with said steerable wheels and with the power train providing drive means extended through said fifth wheel mechanism, a gear transfer box in the drive train suspended from the steering chassis between said inner ends of the axle frame, an auxiliary gear box pivotally mounted on each of the axles, and drive members extended between said auxiliary boxes and said gear transfer box affording an axis of rotation for said axle frames during said transverse tipping thereof.

9. The compound steering mechanism of claim 8 including an elongated torsion bar connected between each of said auxiliary gear boxes and said gear transfer box yieldably to resist said transverse tipping of the axle frames.

10. The compound steering mechanism of claim 9 in which said fifth wheel mechanism comprises an elongated cylindrical column mounted in depending relation from the forward end of the main frame of the vehicle and having a lower annular flange providing a frusto-conical lower annular surface, and a substantially circular cupped housing mounted on the steering chassis intermediate its ends and providing a frusto-conical seat corresponding to the flange of the column rotatably slidingly receiving the same for accommodating transverse tipping of the main frame relative to the steering chassis.

References Cited

UNITED STATES PATENTS

| | | | |
|---|---|---|---|
| 1,402,175 | 1/1922 | Overman | 280—81.5 X |
| 2,291,626 | 8/1942 | Huber | 180—14 |
| 2,648,392 | 8/1953 | Brown | 180—23 |

A. HARRY LEVY, *Primary Examiner.*

U.S. Cl. X.R.

180—14, 50; 280—81.5, 91, 100, 109, 433